US012513762B2

(12) United States Patent
Yoshikawa

(10) Patent No.: US 12,513,762 B2
(45) Date of Patent: Dec. 30, 2025

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 18/146,486

(22) Filed: Dec. 27, 2022

(65) Prior Publication Data

US 2023/0137441 A1    May 4, 2023

Related U.S. Application Data

(63) Continuation of application No. PCT/JP2021/021401, filed on Jun. 4, 2021.

(30) Foreign Application Priority Data

Jul. 21, 2020    (JP) .................................. 2020-124643

(51) Int. Cl.
*H04W 76/15*    (2018.01)
*H04L 5/00*    (2006.01)

(52) U.S. Cl.
CPC ........... *H04W 76/15* (2018.02); *H04L 5/0053* (2013.01)

(58) Field of Classification Search
CPC .............................. H04W 76/15; H04L 5/0053
See application file for complete search history.

(56) References Cited

U.S. PATENT DOCUMENTS

| 10,511,953 | B2 | 12/2019 | Yoshikawa |
| 11,140,539 | B2 | 10/2021 | Yoshikawa |
| 2019/0150214 | A1 | 5/2019 | Zhou et al. |

FOREIGN PATENT DOCUMENTS

| CN | 114223310 A | * | 3/2022 | ............. H04L 69/14 |
| EP | 3609209 A1 | | 2/2020 | |
| EP | 4145938 A1 | * | 3/2023 | ............. H04L 5/001 |
| JP | 2018050133 A | | 3/2018 | |
| KR | 20170030758 A | | 3/2017 | |
| KR | 20220152211 A | * | 11/2022 | |
| WO | 2020022814 A1 | | 1/2020 | |
| WO | 2020040589 A1 | | 2/2020 | |
| WO | WO-2020050648 A1 | * | 3/2020 | |
| WO | 2020091332 A1 | | 5/2020 | |
| WO | WO-2021010606 A1 | * | 1/2021 | ............. H04L 69/14 |

(Continued)

OTHER PUBLICATIONS

Co-pending U.S. Appl. No. 18/161,151, filed Jan. 30, 2023.

(Continued)

*Primary Examiner* — Saad A. Waqas
(74) *Attorney, Agent, or Firm* — Venable LLP

(57) ABSTRACT

A communication apparatus for wirelessly communicating with another communication apparatus, comprising: a transmission unit configured to transmit, to the other communication apparatus, a trigger frame used as a trigger to instruct the other communication apparatus to execute data transmission in a multi-link, wherein the trigger frame includes identification information for identifying another link different from a link in which the trigger frame is transmitted in the multi-link.

16 Claims, 9 Drawing Sheets

(56) References Cited

FOREIGN PATENT DOCUMENTS

WO        2022/018984 A1      1/2022

OTHER PUBLICATIONS

Co-pending U.S. Appl. No. 18/065,024, filed Dec. 13, 2022.
Extended European Search Report issued Jul. 9, 2024 in counterpart European Patent Appln. No. 21845177.1.
Kim et al., "Ul Mu Efficiency and Multi-Link," IEEE 802.11-19/1918r0, LG Electronics, Nov. 5, 2019.
Chen, Gheng (Intel). Multi-link Policy Framework, IEEE 802.22-19/1932r1, Jan. 16, 2020, slides 2-9.
International Search Report issued in corresponding parent International Application No. PCT/JP2021/021401 dated Aug. 24, 2021.
Cai Xiuzhen, "Advanced Data Link Control (HDLC) protocol," China Academic Journal Electronic Publishing House, Jul. 25, 2005.
Chinese Office Action dated Apr. 3, 2025 in counterpart Chinese Patent Appln. No. 202180060051.1.

\* cited by examiner

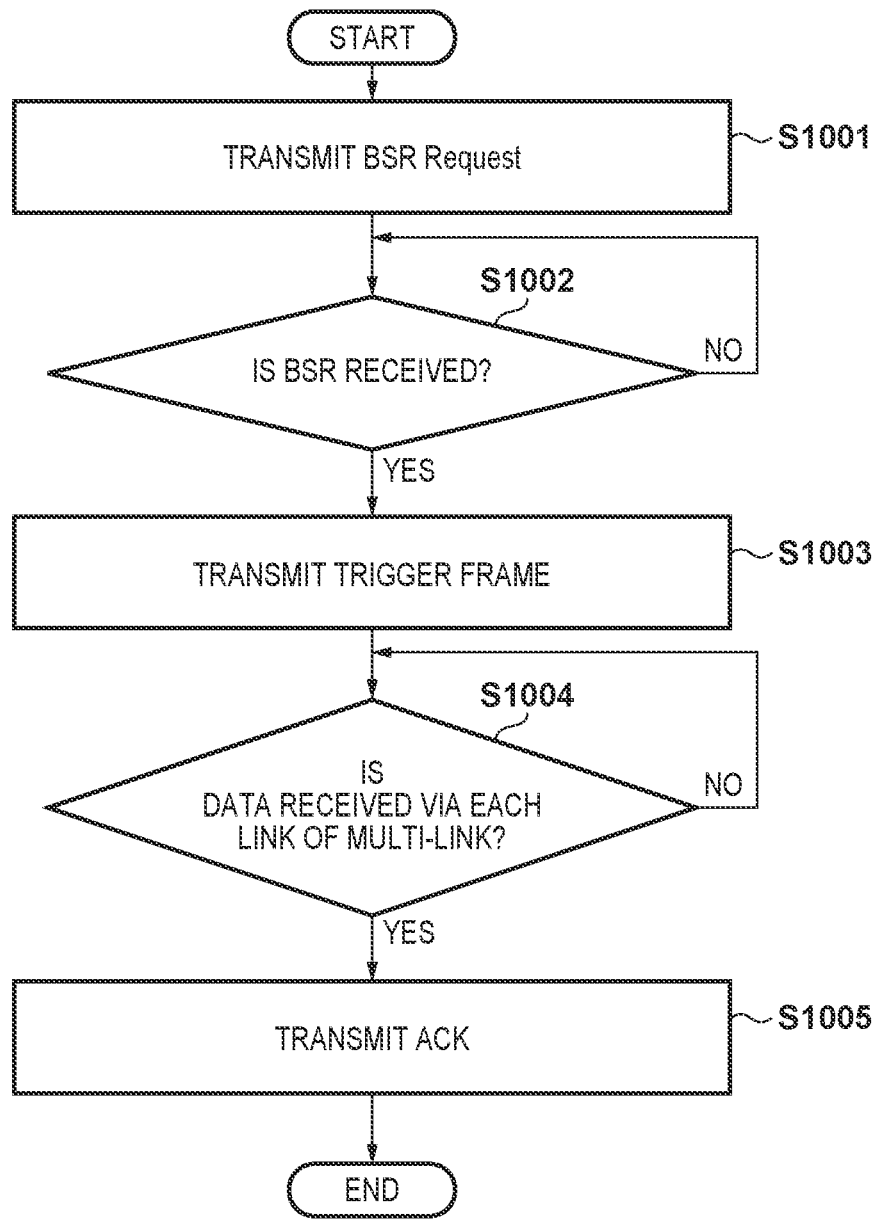

ND STORAGE MEDIUM

COMMUNICATION APPARATUS, CONTROL METHOD FOR COMMUNICATION APPARATUS, AND STORAGE MEDIUM

CROSS-REFERENCE TO RELATED APPLICATIONS

This application is a Continuation of International Patent Application No. PCT/JP2021/021401, filed Jun. 4, 2021, which claims the benefit of Japanese Patent Application No. 2020-124643 filed Jul. 21, 2020, both of which are hereby incorporated by reference herein in their entirety.

BACKGROUND OF THE INVENTION

Field of the Invention

The present invention relates to a communication apparatus, a control method for the communication apparatus, and a storage medium and, more particularly, to an operation parameter transmission/reception technique in wireless communication.

Along with the recent increase in a data amount to be communicated, communication techniques such as a wireless LAN (Local Area Network) have been developed. As the main communication standard of the wireless LAN, the IEEE (Institute of Electrical and Electronics Engineers) 802.11 standard series is known. The IEEE802.11 standard series includes IEEE802.11a/b/g/n/ac/ax standards. For example, in the latest IEEE802.11ax standard, a technique for not only implementing high peak throughput of 9.6 gigabits per sec (Gbps) at maximum but also improving the communication rate under congestion by using OFDMA (Orthogonal Frequency-Division Multiple Access) is standardized (see PTL 1). Note that OFDMA is an abbreviation for Orthogonal Frequency-Division Multiple Access. In OFDMA, a method of using, as a trigger, a frame called a trigger frame at the time of transmitting data from an STA (Station) to an AP (Access Point) is described.

As a succeeding standard for further improving the throughput, the frequency use efficiency, and the latency of communication, Task Group called IEEE802.11be has been formed. In the IEEE802.11be standard, there has been examined a technique for allowing one AP (Access Point) to establish a plurality of links with one STA (Station) via a plurality of different frequency channels to perform communication.

CITATION LIST

Patent Literature

PTL 1: Japanese Patent Laid-Open No. 2018-50133

In the IEEE802.11be standard, there has been examined multi-link communication in which the AP and the STA establish links via different frequency channels to perform communications simultaneously. However, if the STA performs frame transmission using a trigger frame as a trigger in each of the plurality of links, the AP needs to transmit the trigger frame in each link. Even if the trigger frames are simultaneously transmitted in the respective links, the STA cannot always receive the trigger frames at the same time. In this case, when the timing of transmitting data is shifted for each link, interference between the links may be increased. As described above, in multi-link communication, when the AP and the STA execute communication based on a trigger frame, if the trigger frame is transmitted in each link, the communication timing may be shifted.

The present invention has been made in consideration of the above problem, and provides a technique for preventing the shift of a communication timing in multi-link communication.

SUMMARY OF THE INVENTION

According to one aspect of the disclosure, there is provided a communication apparatus for wirelessly communicating with another communication apparatus, comprising: a transmission unit configured to transmit, to the other communication apparatus, a trigger frame used as a trigger to instruct the other communication apparatus to execute data transmission in a multi-link, wherein the trigger frame includes identification information for identifying another link different from a link in which the trigger frame is transmitted in the multi-link.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 10 is a flowchart illustrating the procedure of processing executed by the communication apparatus 102 according to the first embodiment.

DESCRIPTION OF THE EMBODIMENTS

Figure 1:
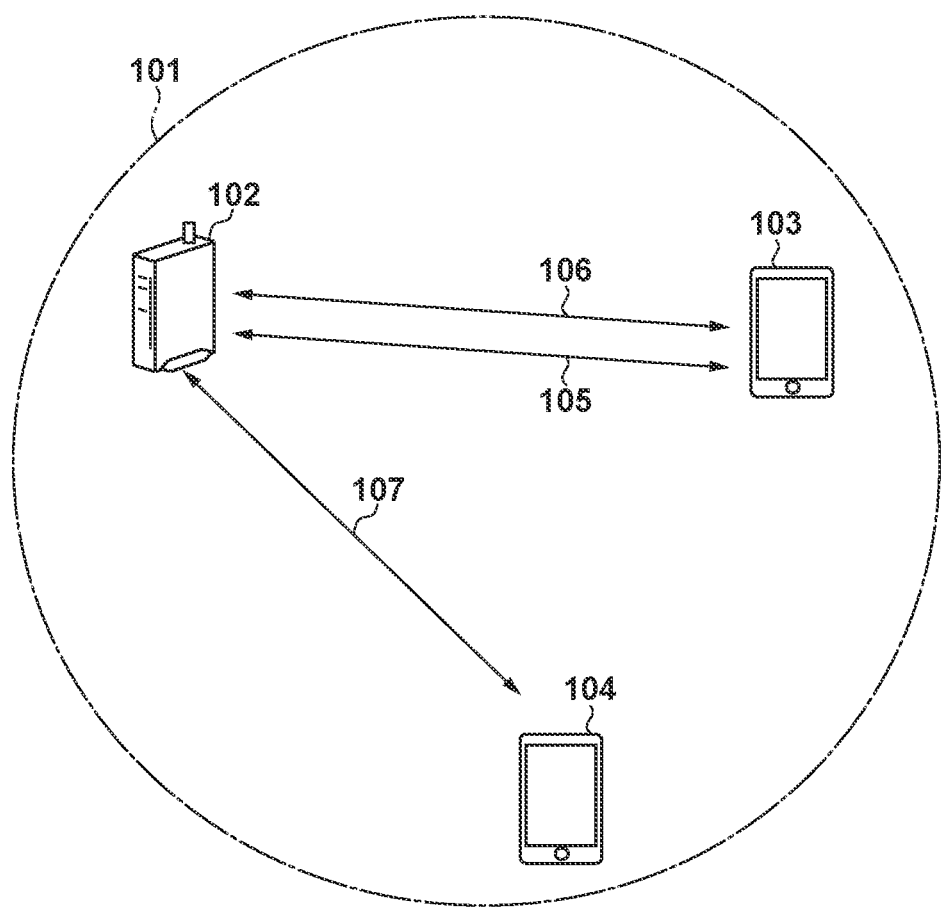
FIG. 1 is a view showing an example of the configuration of a network according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Overall Configuration of Wireless Communication System>

FIG. 1 shows an example of the configuration of a network which a communication apparatus 102 (to be referred to as an AP 102 hereinafter) joins according to the embodiment. Each of communication apparatuses 103 and 104 (to be referred to as STAs 103 and 104 hereinafter) is a station (STA) having a role of joining a network 101. The AP 102 can communicate with the STAs 103 and 104.

Each of the AP 102 and STAs 103 and 104 can execute wireless communication complying with the IEEE802.11be (EHT) standard. Note that IEEE is an abbreviation for Institute of Electrical and Electronics Engineers. Each of the AP 102 and STAs 103 and 104 can execute communication at a frequency in each of the 2.4-, 5-, and 6-GHz bands. However, the frequency band used by each communication apparatus is not limited to them, and a different frequency band such as the 60-GHz band may be used. Each of the AP 102 and STAs 103 and 104 can execute communication using 20-, 40-, 80-, 160-, and 320-MHz bandwidths. However, the bandwidth used by each communication apparatus is not limited to them, and a different bandwidth such as 240- or 4-MHz bandwidth may be used.

Each of the AP 102 and STAs 103 and 104 can implement Multi-User (MU) communication of multiplexing signals of a plurality of users by executing OFDMA communication complying with the IEEE802.11be standard. Note that OFDMA is an abbreviation for Orthogonal Frequency-Division Multiple Access. In OFDMA communication, some (resource units (RUs)) of divided frequency bands are allocated to the respective STAs not to overlap each other and the carrier waves of the respective STAs are orthogonal to each other. Therefore, the AP can simultaneously communicate with the plurality of STAs in the defined bandwidth.

Note that each of the AP 102 and STAs 103 and 104 is assumed to comply with the IEEE802.11be standard. In addition to this, each of the AP 102 and STAs 103 and 104 may support a legacy standard defined before the IEEE802.11be standard. More specifically, each of the AP 102 and STAs 103 and 104 may support at least one of the IEEE802.11a/b/g/n/ac/ax standards. Furthermore, in addition to the IEEE802.11 series standards, each of the AP 102 and STAs 103 and 104 may support another communication standard such as Bluetooth®, NFC, UWB, ZigBee, or MBOA. Note that NFC is an abbreviation for Near Field Communication. Furthermore, UWB is an abbreviation for Ultra Wide Band, and MBOA is an abbreviation for Multi Band OFDM Alliance. UWB includes wireless USB, wireless 1394, and WiNET. In addition, each of the AP 102 and STAs 103 and 104 may support a communication standard of wired communication such as a wired LAN. Practical examples of the AP 102 are a wireless LAN router and a personal computer (PC), but are not limited to them.

The AP 102 may be an information processing apparatus such as a radio chip that can execute wireless communication complying with the IEEE802.11be standard. Practical examples of each of the STAs 103 and 104 are a camera, a tablet, a smartphone, a PC, a mobile phone, and a video camera, but are not limited to them. Each of the STAs 103 and 104 may be an information processing apparatus such as a radio chip that can execute wireless communication complying with the IEEE802.11be standard. Furthermore, the wireless network shown in FIG. 1 includes the one AP and the two STAs but the number of APs, the number of STAs, and the arrangement example are not limited to this example.

Each communication apparatus can execute communication using 20-, 40-, 80-, 160-, and 320-MHz bandwidths.

The AP 102 and the STA 103 execute multi-link communication of establishing links via a plurality of frequency channels to perform communication. In the IEEE802.11 series standard, the bandwidth of each frequency channel is defined as 20 MHz. The frequency channel indicates a frequency channel which is defined in the IEEE802.11 series standard and in which wireless communication complying with the IEEE802.11 series standard can be executed. In the IEEE802.11 series standard, a plurality of frequency channels are defined in each of the 2.4-, 5-, and 6-GHz frequency bands. Note that a bandwidth of 40 MHz or more can be used in one frequency channel by bonding adjacent frequency channels.

For example, as shown in FIG. 1, the AP 102 can establish, with the STA 103, a first link 105 via the first frequency channel in the 2.4-GHz band and a second link 106 via a second frequency channel in the 5-GHz band, and can execute communication via both the links. In this case, the AP 102 executes multi-link communication of maintaining the second link 106 via the second frequency channel while maintaining the first link 105 via the first frequency channel. Thus, the AP 102 can establish links with the STA 103 via the plurality of frequency channels, thereby improving throughput in communication with the STA 103. In this embodiment, the first link 105 is a 20-MHz connection using channel 5 in the 2.4-GHz band, and has a link number of 1. The second link 106 is a 40-MHz connection using channel 36 in the 5-GHz band, and has a link number of 2. Furthermore, a link 107 that connects the AP 102 and the STA 104 is a 40-MHz connection using channel 36 in the 5-GHz band.

Note that the AP 102 and the STA 103 may establish a plurality of links using different frequency bands in multi-link communication. For example, in addition to the first link 105 in the 2.4-GHz band and the second link 106 in the 5-GHz band, the AP 102 and the STA 103 may establish the third link (not shown) in 6-GHz band. Alternatively, links may be established via a plurality of different channels included in the same frequency band. For example, the first link 105 via channel 1 in the 2.4-GHz band and the second link 106 via channel 5 in the 2.4-GHz band may be established.

Note that links of the same frequency band and links of different frequency bands may be mixed. For example, the AP 102 and the STA 103 may establish the first link 105 and the second link 106 via channel 1 and channel 5 in the 2.4-GHz band, respectively, and also establish the third link (not shown) via channel 36 in the 5-GHz band. If the AP 102 establishes the plurality of connections of different frequencies with the STA 103, even if a given band is congested, the AP 102 can establish communication with the STA 103 in another band, thereby preventing degradation of throughput in communication with the STA 103.

In multi-link communication, the plurality of links established by the AP 102 and the STA 103 use at least different frequency channels. Note that in multi-link communication, the channel spacing between the frequency channels of the plurality of links established by the AP 102 and the STA 103 is set to at least a spacing larger than 20 MHz. Note that the AP 102 and the STA 103 establish the first link 105 and the second link 106 in this embodiment but may establish three or more links.

If multi-link communication is performed, each of the AP 102 and the STA 103 divides one data and transmits the divided data to the partner apparatus via the plurality of links. Alternatively, each of the AP 102 and the STA 103 may transmit the same data via each of the plurality of links, thereby setting communication via one link as backup communication for communication via another link. More specifically, the AP 102 transmits the same data to the STA 103 via the links 105 and 106. In this case, for example, even if an error occurs in communication via the link 105, the AP 102 transmits the same data via the link 106, and thus the STA 103 can receive the data transmitted from the AP 102.

Alternatively, the AP 102 and the STA 103 may select a link to be used in accordance with the kind of a frame or data to be communicated. For example, the AP 102 may transmit a management frame via the link 105, and transmit a data frame including data via the link 106. Note that the management frame specifically indicates a Beacon frame, a Probe Request frame/Response frame, or an Association Request frame/Response frame. In addition to these frames, a Disassociation frame, an Authentication frame, a De-Authentication frame, and an Action frame are also called management frames.

The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and disconnect the connection. The Action frame is a frame used to execute an additional function other than the above-described ones.

Each of the AP 102 and the STA 103 transmits/receives the management frames complying with the IEEE802.11 series standard. Alternatively, when transmitting data concerning a captured image, the AP 102 may transmit, via the link 105, meta information such as the date, parameters (f-number and shutter speed) at the time of image capturing, and position information, and transmit pixel information via the link 106.

The AP 102 and the STA 103 may be configured to execute MIMO (Multiple-Input And Multiple-Output) communication. In this case, each of the AP 102 and the STA 103 includes a plurality of antennas, and one of them transmits, from the respective antennas, different signals using the same frequency channel. The reception-side apparatus simultaneously receives, using the plurality of antennas, all the signals arriving from the plurality of streams, separates the signals the streams, and decodes them. As compared with a case in which no MIMO communication is executed, the AP 102 and the STA 103 can communicate more data in the same time by executing MIMO communication. When performing multi-link communication, the AP 102 and the STA 103 may execute MIMO communication in some links.

The AP 102 can implement Multi-User (MU) communication of multiplexing signals of a plurality of users by executing OFDMA communication complying with the IEEE802.11be standard. OFDMA communication is an abbreviation for Orthogonal Frequency-Division Multiple Access. In OFDMA communication, some (resource units (RUs)) of divided frequency bands are allocated to the respective STAs not to overlap each other, and the carrier waves allocated to the respective STAs are orthogonal to each other. Therefore, the AP can simultaneously communicate with the plurality of STAs.

In the IEEE802.11ax standard, a data transfer method from the STA to the AP by OFDMA is defined. First, the AP confirms whether there is data to be sent to each STA. A frame used for the confirmation at this time is called a BSR (Buffer Status Report) Request frame. In response to this, each STA notifies the AP of the amount of data to be transmitted to the AP. Information in the frame at this time is called a BSR (Buffer Status Report).

Note that this method is merely an example, and there is also provided a method of notifying the AP of a BSR by another method. For example, a BSR may be included in a data frame or a control frame to be transmitted from the STA to the AP, and the frame may be transmitted.

Based on the BSR received from each STA, the AP assigns the STA for each sub-channel, and transmits a frame that is a start point of data transmission. The frame that is the start point is called a Trigger frame. The Trigger frame includes information indicating a sub-channel to be used by each STA to perform data transmission and information of an ensured period. Based on the information of the Trigger frame, the STA transmits the data to the AP. In this way, even in a congested environment in which there exist many STAs, the STA can transmit the data while avoiding a collision.

<Hardware Arrangement of Communication Apparatus (AP and STA)>

Figure 2:
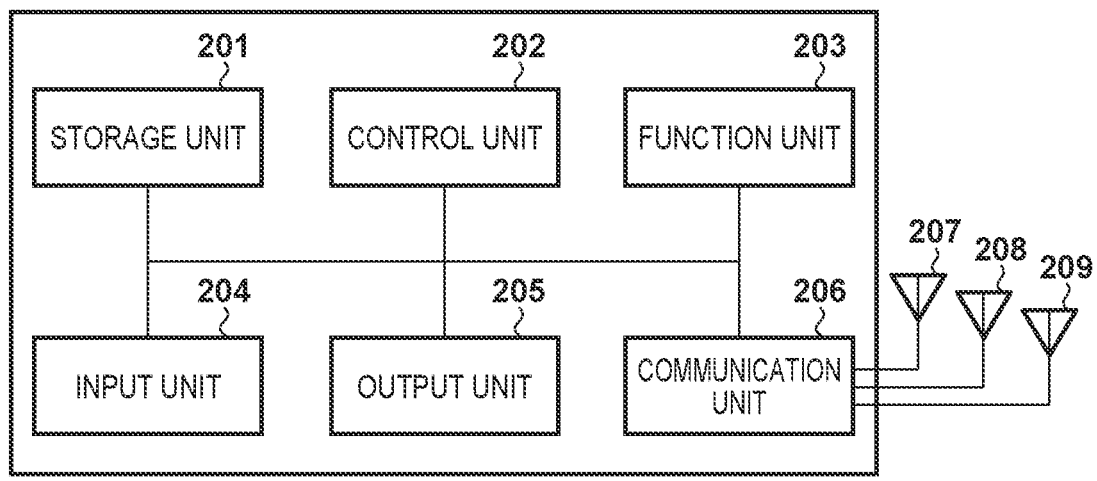
FIG. 2 is a block diagram showing an example of the hardware arrangement of a communication apparatus according to the embodiment.

Subsequently, an example of the hardware arrangement of the AP 102 according to the embodiment will be described with reference to FIG. 2. Note that the arrangement of the STA 103 or 104 is the same as that of the AP 102. The AP 102 includes a storage unit 201, a control unit 202, a function unit 203, an input unit 204, an output unit 205, a communication unit 206, and antennas 207, 208, and 209. Note that only the antenna 207 may be provided.

The storage unit 201 is formed by at least one memory such as a ROM and a RAM, and stores computer programs configured to perform various kinds of operations to be described later and various kinds of information such as communication parameters for wireless communication. ROM is an abbreviation for Read Only Memory, and RAM is an abbreviation for Random Access Memory. Note that as the storage unit 201, not only a memory such as a ROM or a RAM but also a storage medium such as a flexible disk, a hard disk, an optical disk, a magnetooptical disk, a CD-ROM, a CD-R, a magnetic tape, a nonvolatile memory card, or a DVD may be used. The storage unit 201 may include a plurality of memories.

The control unit 202 is formed by, for example, at least one processor such as a CPU or an MPU, and controls the whole AP 102 by executing the computer programs stored in the storage unit 201. Note that the control unit 202 may control the whole AP 102 by cooperation of the computer programs stored in the storage unit 201 and an OS (Operating System). The control unit 202 generates data and a signal (radio frame) to be transmitted in communication with another communication apparatus. Note that CPU is an abbreviation for Central Processing Unit, and MPU is an abbreviation for Micro Processing Unit. The control unit 202 may include a plurality of processors such as a multi-core processor, and control the whole AP 102 by the plurality of processors.

Furthermore, the control unit 202 controls the function unit 203 and executes wireless communication and predetermined processing such as image capturing, printing, or projection. The function unit 203 is hardware for the AP 102 to execute predetermined processing.

The input unit 204 accepts various kinds of operations from the user. The output unit 205 performs various kinds of outputs to the user via a monitor screen or a loudspeaker. Here, the output by the output unit 205 includes display on the monitor screen, audio output by the loudspeaker, and vibration output. Note that both the input unit 204 and the output unit 205 may be implemented by one module, like a touch panel. Note that each of the input unit 204 and the output unit 205 may be integrated with the AP 102 or may be separated from the AP 102.

The communication unit 206 controls wireless communication complying with the IEEE802.11be standard. The communication unit 206 may control wireless communication complying with another IEEE802.11 series standard in addition to the IEEE802.11be standard, and control wired communication such as a wired LAN. The communication unit 206 controls the antennas 207, 208, and 209 to transmit/receive signals for wireless communication generated by the control unit 202.

Note that if the AP 102 supports the NFC standard or Bluetooth standard in addition to the IEEE802.11be standard, the AP 102 may control wireless communication complying with these communication standards. If the AP 102 can execute wireless communication complying with each of a plurality of communication standards, it may include the communication unit and the antenna supporting each communication standard. The AP 102 communicates data such as image data, document data, or video data with the STAs 103 and 104 via the communication unit 206. Note that the antennas 207, 208, and 209 may be formed separately from the communication unit 206 or may be integrated with the communication unit 206 to form one module.

Each of the antennas 207, 208, and 209 is an antenna configured to execute communication in the 2.4-, 5-, and 6-GHz bands. Note that the AP 102 includes the three antennas in this embodiment but may include one antenna. Alternatively, the AP 102 may include a different antenna for each frequency band. If the AP 102 includes a plurality of antennas, it may include the communication units 206 respectively corresponding to the antennas.

<Functional Arrangement of Communication Apparatus (AP and STA)>

Figure 3:
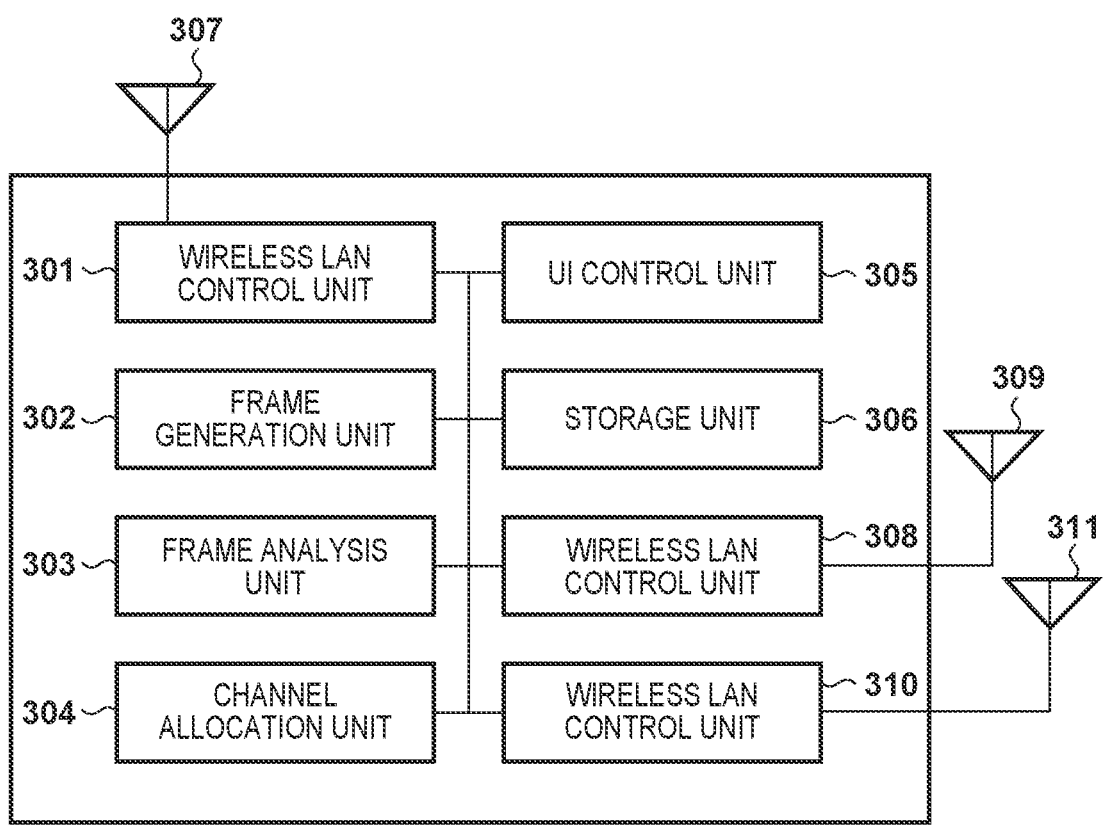
FIG. 3 is a block diagram showing an example of the functional arrangement of the communication apparatus according to the embodiment.

An example of the functional arrangement of the AP 102 according to the embodiment will be described next with reference to FIG. 3. Note that the STAs 103 and 104 also have the same arrangement. Assume here that the AP 102 includes three wireless LAN control units 301, 308, and 310. Note that the number of wireless LAN control units is not limited to three and may be one, two, or four or more. The AP 102 further includes a frame generation unit 302, a frame analysis unit 303, a channel allocation unit 304, a UI control unit 305, a storage unit 306, and wireless antennas 307, 309, and 311.

Each of the wireless LAN control units 301, 308, and 310 includes an antenna and circuit for transmitting/receiving radio signals to/from another wireless LAN apparatus, and a program for controlling them. The wireless LAN control unit 301 executes wireless LAN communication control based on a frame generated by the frame generation unit 302 in accordance with the IEEE802.11 standard series.

The frame generation unit 302 generates a wireless control frame to be transmitted by the wireless LAN control unit 301. In some cases, the generated frame may be transmitted by the wireless LAN control unit 308 or 310. The contents of the wireless control frame generated by the frame generation unit 302 may be restricted by settings stored in the storage unit 306. The contents may be changed by user settings from the UI control unit 305.

The frame analysis unit 303 interprets a frame received by each of the wireless LAN control units 301, 308, and 310 and reflects the contents on each of the wireless LAN control units 301, 308, and 310. If the frame received by any of the control units is processed by the frame control unit 303, it becomes possible to control the wireless LAN control unit that has not received the frame.

When instructing communication with the communication partner or communication with the STA, the channel allocation unit 304 appropriately allocates a channel to be used for communication between the AP and the STA. In accordance with the decided allocation, for example, communication is executed using the channel used for communication between the AP 102 and the STA 103 or a sub-channel defined in the channel.

The UI control unit 305 includes hardware associated with user interfaces such as a touch panel and buttons used to accept an operation on the AP by the user, and a program for controlling the hardware. Note that the UI control unit 305 also has a function of presenting information to the user, such as display of an image or the like or audio output.

The storage unit 306 is a storage device that can be formed by a ROM, a RAM, and the like which save data and programs to be operated by the AP.

<Processing>

In this embodiment, the AP 102 and the STA 103 execute multi-link communication. As a communication method, OFDMA is adopted. If the STA 103 transmits data to the AP 102, it transmits the data by using, as a start point, a trigger frame received from the AP 102. Note that in this embodiment, a case in which there is no STA 104 and the AP 102 and the STA 103 communicate with each other will be exemplified.

Figure 4:
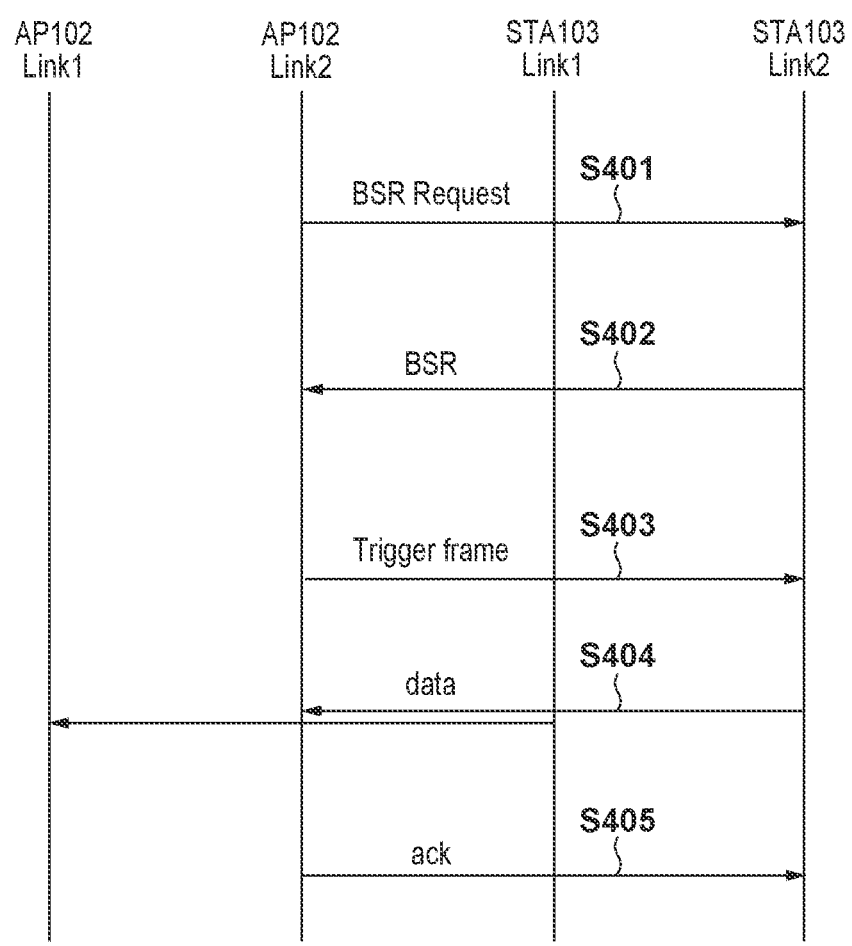
FIG. 4 is a sequence chart when a communication apparatus 103 transmits data to a communication apparatus 102 according to the first embodiment.

FIG. 4 is a sequence chart showing an example of a processing sequence when the AP 102 receives data from the STA 103 according to this embodiment.

Referring to FIG. 4, the AP 102 transmits a BSR Request to a currently connected STA (the STA 103 in the example shown in FIG. 4) (S401). At this time, the BSR Request may be transmitted in each link or only in a representative link. By transmitting the BSR Request only in a given link, another communication apparatus can effectively use a band in a link in which no BSR Request is transmitted, and it is also possible to suppress the power consumption of the AP 102. In the example shown in FIG. 4, the BSR Request is transmitted by setting link 2 as a representative link.

Figure 6:
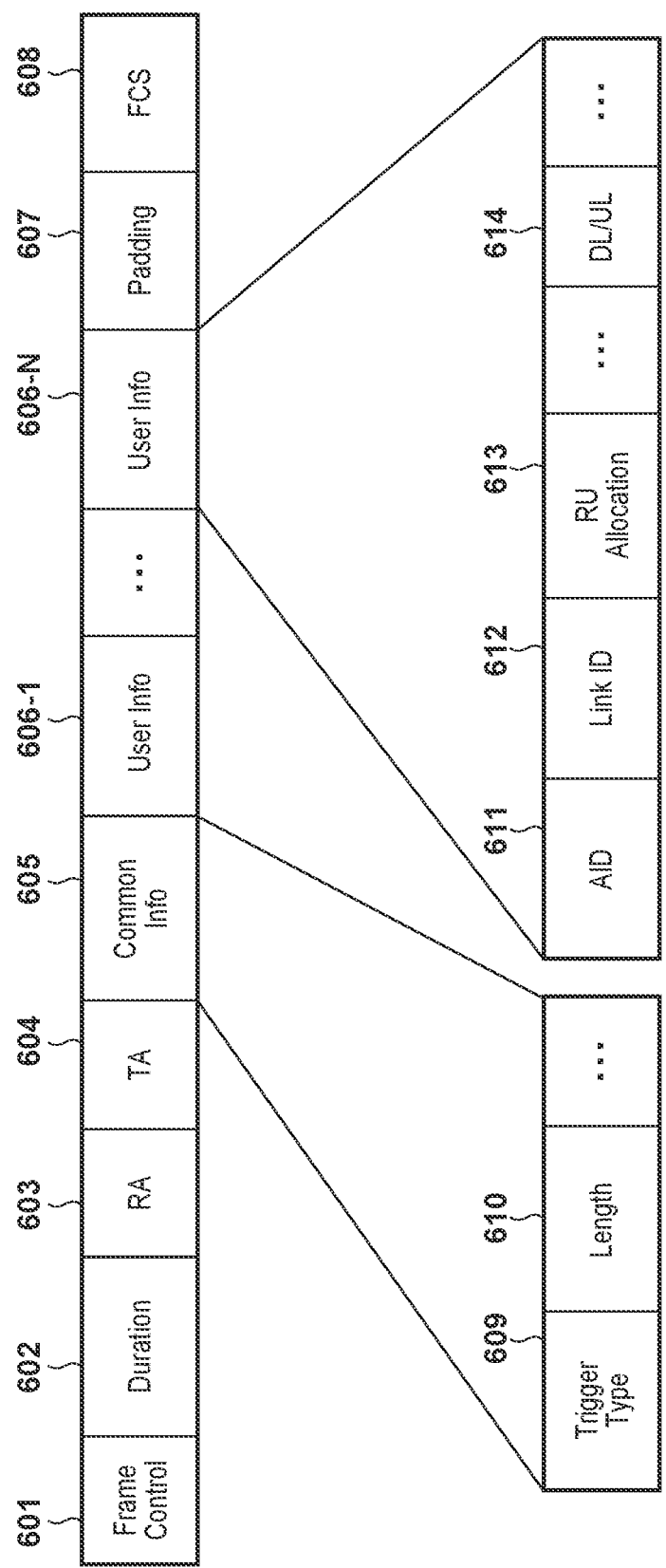
FIG. 6 is a view showing an example of the trigger frame transmitted from the communication apparatus 102 to the communication apparatus 103 and a communication apparatus 104 according to the first embodiment.

As the frame structure of the BSR Request transmitted at this time, part of the structure of the trigger frame exemplified in FIG. 6 is used. More specifically, a Frame Control field 601, a Duration field 602, an RA field 603, a TA field 604, and a Common Info field 605 are used. The Common Info field 605 includes a Trigger Type subfield 609 and a Length subfield 610. In this example, the subfield value of the Trigger Type subfield 609 is set to 4 (see Table 1 to be described later). The subfield value of the Length subfield 610 is set to 0. No User Info field 606 is held. After that, a Padding field 607 and an FCS field 608 follow. Note that the length of the subsequent subfield may be set in the Length subfield 610. In this case, a field indicating a channel number or link number to be used to request a BSR may be provided after the Length subfield 610. Details of the remaining structure of the trigger frame exemplified in FIG. 6 will be described later.

Upon receiving the BSR Request, the STA 103 returns a BSR to the AP 102 (S402). The BSR to be returned may be transmitted in each link or only in the representative link. As the link used to return the BSR, the link in which the BSR Request has been received is preferably used. This is because the possibility that the AP 102 stands by for reception of the BSR in the link in which the BSR Request has been received is high. By transmitting the frame only in the representative link, another communication apparatus can effectively use a frequency channel used in a link other than the representative link. In addition, it is possible to suppress power consumed by the STA 103 to perform transmission. In the example shown in FIG. 4, the BSR is returned by setting link 2 as the representative link.

In the transmitted BSR, the buffer size of data to be transmitted in each link may be transmitted or a value obtained by summing the buffer sizes of data to be transmitted in the respective links may be transmitted. Note that an instruction indicating whether to return the sum or the value for each link may be included in the BSR Request. For example, a BSR Policy subfield may be provided after the Length subfield 610, and the value to be returned may be changed in accordance with the value of the BSR Policy subfield. For example, if the value is 0, the buffer size of the data to be transmitted in each link may be requested, and if the value is 1, the buffer size of the data to be transmitted in all the links may be requested.

Alternatively, the AP 102 may receive the BSR by another method. For example, the AP 102 may receive the value of the BSR attached to the data transmitted by the STA 103 in the past, and analyze it. The BSR can be indicated by a QoS Control field of a MAC HEADER. In the QoS Control field, the 0th to third bits indicate the TID of the data and the eighth to 15th bits indicate a Queue Size. The Queue Size includes the size of data to be transmitted from the STA to the AP.

Note that another method of representing a BSR may be used. For example, the BSR can be represented by an HT Control field. By setting 1 in the 0th and first bits of the HT Control field, a manipulated value in the IEEE802.11ax standard is indicated. By setting 1 in the 0th to second bits of the HT Control field, a manipulated value in the IEEE802.11be standard is indicated, and details of the manipulated value may be indicated, as follows.

The manipulated value is classified into a 4-bit Control ID and Control Information. If the 4-bit Control ID is 3, it is indicated that the Control Information is the BSR. If the Control ID is the BSR, the Control Information is formed from ACI Bitmap, Delta TID, ACI High, Scaling Factor, Queue Size High, and Queue Size All subfields. It is possible to notify the communication partner of the more detailed buffer size of the transmission data, as compared with the case in which the BSR is transmitted using the QoS Control field. For example, the ACI Bitmap subfield uses 4 bits, and includes information indicating a specific TID for which data exists. Furthermore, the Scaling Factor field can indicate the scale of the Queue Size. The High Queue Size field indicates the Queue Size for the TID of the highest priority, and Queue Size All field indicates the Queue Size obtained by adding the Queue Sizes for all the TIDs. In addition to the Link field, the Queue Size for each link can be sent.

Upon receiving the BSR from the STA 103, the AP 102 allocates an appropriate RU (Resource Unit) to the STA 103 based on the BSR, and transmits, based on the allocation, a trigger frame including identification information for identifying each link (S403). Note that the identification information to be included is identification information for identifying another link different from the link in which the trigger frame is transmitted in the multi-link. Note also that the identification information of the link in which the trigger frame is transmitted may further be included.

FIG. 6 shows an example of the trigger frame transmitted here. Fields/subfields shown in FIG. 6 comply with a format defined in the IEEE802.11ax standard. That is, the trigger frame includes the Frame Control field 601, the Duration field 602, the RA field 603, the TA field 604, the Common Info field 605, the User Info field 606, the Padding field 607, and the FCS field 608.

The 4-bit Trigger Type subfield 609 in the Common Info field 605 is used to designate a trigger type by this trigger frame. The Length subfield 610 in the Common Info field 605 indicates a communication period common to all slave APs. This communication period corresponds to a data amount that can be transmitted/received by each slave AP. Table 1 exemplifies the correspondence between the subfield value of the Trigger Type subfield 609 and the trigger type.

TABLE 1

| Subfield Value | Trigger Type |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-Link |
| 9-15 | Reserved |

In Table 1, if the subfield value of the Trigger Type subfield 609 is 8, this indicates that this trigger frame instructs transmission of upload data in the multi-link.

The User Info field 606 is a field corresponding to each slave AP. User Info fields 606 the number of which is equal to the number of allocated STAs are connected and transmitted. The User Info field 606 includes an AID subfield 611.

Table 2 shows the correspondence between the subfield value of the AID subfield 611 included in the User Info field 606 and the meaning indicated by the subfield value.

TABLE 2

| AP ID Subfield | Contents |
| --- | --- |
| 0 | Resource unit (RU) is used for random access of connected STA |
| 1-2007 | RU is allocated to connected STA having same AID value |
| 2008-2044 | Reserved |
| 2045 | RU is used for random access of unconnected STA |
| 2046 | No RU is allocated to STA |
| 2047-4094 | Reserved |
| 4095 | Beginning of padding field |

In this embodiment, the subfield value of the AID subfield 611 is a value allocated to the STA 103 by the AP 102. For example, 1 is set.

A Link ID subfield 612 included in the User Info field 606 includes identification information of the link in which the currently connected STA transmits data. For example, if data transmission via the link with the link number of 1 operating in channel 5 in the 2.4-GHz band is instructed, the value is set to 1. Note that if the AP 102 and the STA 103 are connected to each other, the AP 102 allocates the link number to the STA 103. As the Link ID subfield, a 3-bit subfield is prepared. The number of bits to be prepared is not limited to this. For example, the Link ID subfield may have 2 bits or 5 bits.

Note that the channel number may be allocated as the value of the subfield. For example, if the STA 103 instructs the AP 102 to execute data transmission in channel 5 in the 2.4-GHz band, the value may be set to 5. If the channel value is set, an 8-bit subfield is prepared. Note that the value set here may be a value linked with the band. For example, 1 is set for the 2.4-GHz band, 2 is set for the 5-GHz band, and 3 is set for the 6-GHz band. In this case, if the 2.4-GHz band is allocated, 1 is set in the channel subfield. In this case, a 2-bit subfield is prepared.

Instead of the link number or the channel number, the frequency band of the link, the number of the resource unit (RU), or the like can be used as the identification information.

An RU Allocation subfield 613 is used to specify the tone size and RU of the corresponding STA. As the RU Allocation subfield, an 8-bit subfield is prepared.

The STA 103 can know the channel frequency at which data is transmitted to the AP 102, by a combination of the Link ID subfield 612 and the RU Allocation subfield 613. Table 3 shows examples of the value of the RU allocated to the RU Allocation subfield 613.

TABLE 3

| RU Allocation Subfield | Use Bandwidth | RU size | RU Index |
| --- | --- | --- | --- |
| 0-8 | 20 MHz, 40 MHz, 80 MHz, 80 + 80 MHz, 160 MHz | 26 | RU 1 to RU 9 |
| 9-17 | 40 MHz, 80 MHz, 80 + 80 MHz, 160 MHz | 26 | RU 10 to RU 18 |
| 18-36 | 80 MHz, 80 + 80 MHz, 160 MHz | 26 | RU 19 to RU 37 |
| 37-40 | 20 MHz, 40 MHz, 80 MHz, 80 + 80 MHz, 160 MHz | 52 | RU 1 to RU 4 |
| 41-44 | 40 MHz, 80 MHz, 80 + 80 MHz, 160 MHz | 52 | RU 5 to RU 8 |
| 45-52 | 80 MHz, 80 + 80 MHz, 160 MHz | 52 | RU 9 to RU 16 |
| 53, 54 | 20 MHz, 40 MHz, 80 MHz, 80 + 80 MHz, 160 MHz | 106 | RU 1, RU 2 |
| 55, 56 | 40 MHz, 80 MHz, 80 + 80 MHz, 160 MHz | 106 | RU 3, RU 4 |
| 57-60 | 80 MHz, 80 + 80 MHz, 160 MHz | 106 | RU 5 to RU 8 |
| 61 | 20 MHz, 40 MHz, 80 MHz, 80 + 80 MHz, 160 MHz | 242 | RU 1 |
| 62 | 40 MHz, 80 MHz, 80 + 80 MHz, 160 MHz | 242 | RU 2 |
| 63, 64 | 80 MHz, 80 + 80 MHz, 160 MHz | 242 | RU 3, RU 4 |
| 65 | 40 MHz, 80 MHz, 80 + 80 MHz, 160 MHz | 484 | RU 1 |
| 66 | 80 MHz, 80 + 80 MHz, 160 MHz | 484 | RU 2 |
| 67 | 80 MHz, 80 + 80 MHz, 160 MHz | 996 | RU 1 |
| 68 | 80 + 80 MHz, 160 MHz | 2*996 | RU 1 |

For example, if the frequency used in the channel is 20 MHz, and the value of the RU Allocation subfield 613 is 38, among the RUs to which 52 is allocated as the tone size of the sub-channel, the second RU is allocated to the STA 103. A plurality of RUs may be allocated to the same STA. In this case, the different RU Allocation subfields or the different Link ID subfields of the same AID are allocated. Alternatively, the different RU Allocation subfields of the same Link ID subfield and the same AID are allocated. At this time, the User Info field 606 is prepared for each allocated RU.

Note that another expression method for allocating a plurality of RUs to one STA may be used. For example, a 1-bit Cascaded subfield is prepared after the AID subfield. Then, if the bit is 1, a Cascaded subfield, a Link ID subfield, and an RU Allocation subfield are arranged again after the RU Allocation subfield 613. If the bit is 0, a next subfield follows. In this allocation method, it is possible to allocate the plurality of channels by a smaller number of bits. Even if a bandwidth is different for each channel, the RU can be allocated flexibly.

Note that this expression method is merely an example, and another expression method may be used. In this embodiment, since the channel is simultaneously expressed, the use bandwidth may be limited to a unit of 20 MHz. In this case, the RU Allocation subfield need only have 4 bits. By limiting the bandwidth to 20 MHz, the Cascaded subfield may be prepared.

Note that FIG. 6 is merely an example, and the method of designating the Link ID and RU is not limited to this. For example, in consideration of allocation of the link numbers in ascending order, the RUs are allocated. In this case, for example, if each of channel 1 in the 2.4-GHz band and channel 36 in the 5-GHz band has a bandwidth of 40 MHz, and if allocation is performed only for an RU size of 26, the RUs are allocated as follows. Values 0 to 17 are allocated to the first to 18th RUs to be used in channel 1 in the 2.4-GHz band. Values 18 to 36 are allocated to the 19th to 37th RUs to be used in channel 36 in the 5-GHz band.

In a DL/UL subfield 614, whether the STA transmits or receives data is designated. For example, if the value is 0, the STA transmits data to the AP, and if the value is 1, the AP transmits data to the STA.

Upon receiving the trigger frame transmitted from the AP 102, the STA 103 simultaneously transmits data to the AP 102 via links 1 and 2 in accordance with the allocation (S404). Simultaneous data communication (transmission) is communication in a synchronous mode. In this mode, communications via a plurality of links are synchronously executed. More specifically, communications in the first link (link 1) and the second link (link 2) are started at the same timing. The AP 102 may be able to execute, as a multi-link communication mode, at least one of an asynchronous mode and a semi-asynchronous mode in addition to the synchronous mode. Note that the trigger frame according to this embodiment is not used in the asynchronous mode or semi-asynchronous mode.

In the asynchronous mode, communications via the respective links are executed asynchronously, and communication via the first link and communication via the second link are executed at individual timings. In the semi-asynchronous mode, when performing data communication via one link, if a frequency channel in the other link is available, communications via both the links are executed synchronously.

Upon receiving the data, the AP 102 returns an ACK (Acknowledgement) linked with the data (S405).

Figure 7:
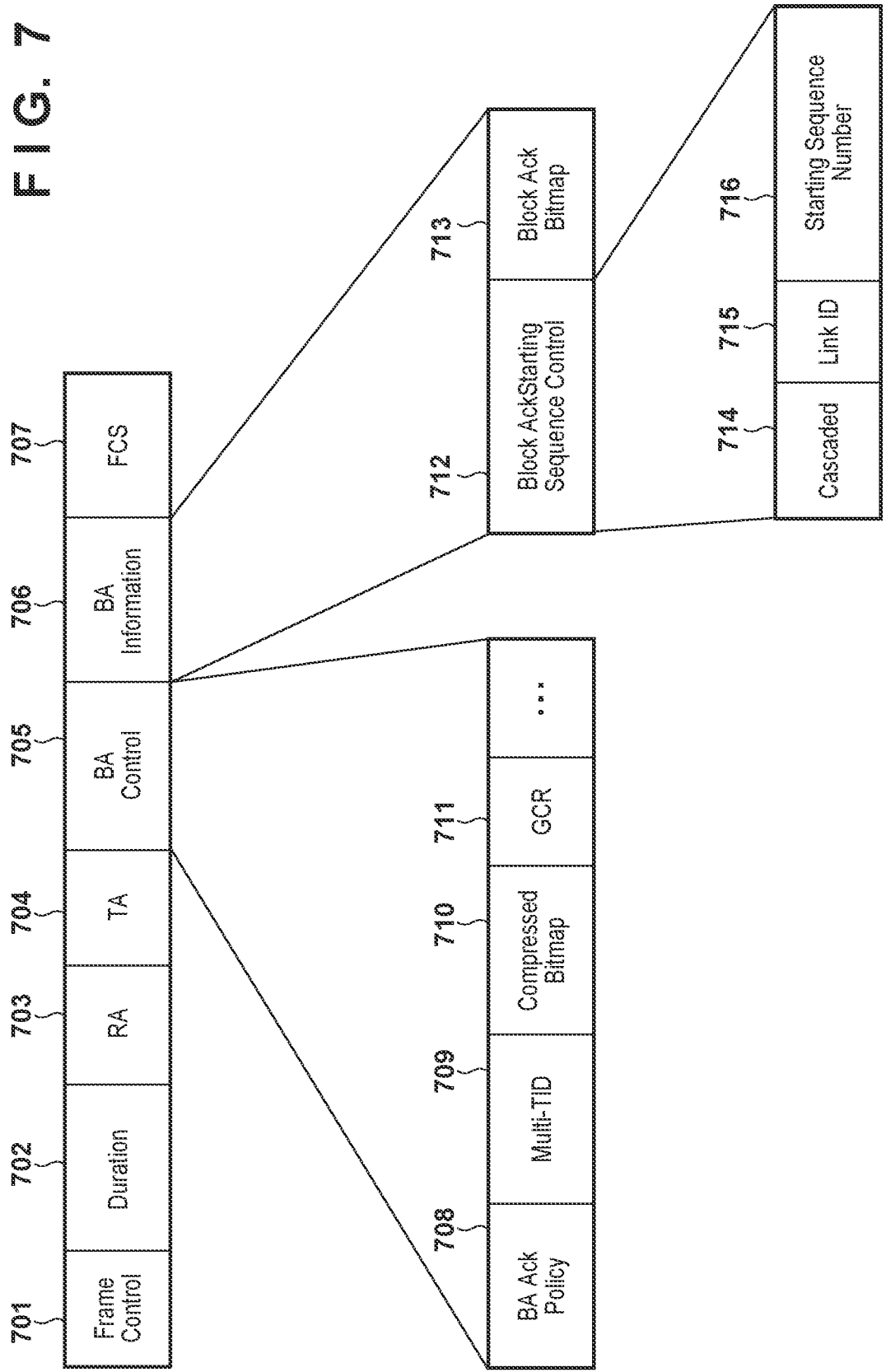
FIG. 7 is a view showing an example of an ACK frame transmitted from the communication apparatus 102 to the communication apparatuses 103 and 104 according to the first embodiment.

At this time, not ACKs for the respective links in which the data have been received but one ACK is transmitted. FIG. 7 shows an example of the ACK transmitted here. FIG.

7 is a view showing an example of the ACK frame transmitted from the AP 102 to the STA 103 according to the first embodiment. Note that in this embodiment, a block ACK (BA) is used as the ACK. According to this frame, one ACK for a plurality of data can be transmitted.

Fields/subfields shown in FIG. 7 comply with a format defined in the IEEE802.11ax standard. That is, the ACK frame includes a Frame Control field 701, a Duration field 702, an RA field 703, a TA field 704, a BA Control field 705, a BA Information field 706, and an FCS field 707.

The BA Control field 705 includes a BA Ack Policy subfield 708, a Multi-TID subfield 709, a Compressed Bitmap subfield 710, and a GCR subfield 711. Among them, a combination of the values of the Multi-TID subfield 709, the Compressed Bitmap subfield 710, and the GCR (Groupcast with retries) subfield 711 designates a Block ACK (BA) type. Table 4 exemplifies the correspondence among the respective subfields and the BA type.

TABLE 4

| Multi-TID | Compressed Bitmap | GCR | BA Type |
|---|---|---|---|
| 0 | 0 | 0 | Basic |
| 0 | 1 | 0 | Compressed |
| 1 | 0 | 0 | Extended Compressed |
| 1 | 1 | 0 | Multi-TID |
| 0 | 0 | 1 | Reserved |
| 0 | 1 | 1 | GCR |
| 1 | 0 | 1 | Reserved |
| 1 | 1 | 1 | Reserved |

For example, if the Multi-TID subfield value is 0, the Compressed Bitmap subfield value is 0, and the GCR subfield value is 0, this indicates that the BA ACK is a Basic ACK.

Note that a dedicated BA type may be provided. For example, if the Multi-TID subfield value is 0, the Compressed Bitmap subfield value is 0, and the GCR subfield value is 1, this may indicates a BA at the time of multi-link communication.

Depending on the BA type, the structure of the BA Information field 706 changes. If the BA type is Basic, a Block Ack Starting Sequence Control subfield 712 and a Block Ack Bitmap subfield 713 are included. The Block Ack Starting Sequence Control subfield 712 includes a Cascaded subfield 714, a Link ID subfield 715, and a Starting Sequence Number subfield 716.

If the value of the Cascaded subfield 714 is 1, this indicates that the BA Information field 706 follows. On the other hand, if the value of the Cascaded subfield 714 is 0, this indicates the last BA Information field. The Link ID subfield 715 is used to designate the value of the link number designated by the AP 102. For example, if the link number is 1, the value is 1. The Starting Sequence Number subfield 716 indicates a sequence number that starts from the subsequent Block Ack Bitmap subfield 713. The Block Ack Bitmap subfield 713 indicates a data frame which has been received. If the third data from the sequence number indicated by the Starting Sequence Number subfield is received, the value of the third bit is set to 1. 0 is set in a bit corresponding to the sequence number which is not received.

In data communication performed using the trigger frame as a start point, it is possible to collectively transmit the trigger frame and the ACK in one link even in multi-link communication. Then, the sequence shown in FIG. 4 ends.

The procedure of the processing executed by the AP 102 in the sequence chart of FIG. 4 will be described with reference to a flowchart shown in FIG. 10.

In step S1001, the AP 102 transmits a BSR Request to the currently connected STA (in this embodiment, the STA 103).

In step S1002, the AP 102 determines whether a BSR transmitted from the currently connected STA (in this embodiment, the STA 103) is received. If the BSR is received, the process advances to step S1003; otherwise, the AP 102 stands by. Note that if no BSR has been received for a predetermined period, the AP 102 may interrupt the processing or may return to step S1001 to retransmit a BSR Request.

In step S1003, the AP 102 allocates an appropriate RU (Resource Unit) to the STA 103 based on the BSR received from the currently connected STA (in this embodiment, the STA 103), and transmits, based on the allocation, a trigger frame including identification information for identifying each link. As described above, the identification information to be included is identification information for identifying another link different from the link in which the trigger frame is transmitted in the multi-link but may further include identification information of the link in which the trigger frame is transmitted.

In step S1004, the AP 102 determines whether data is received from the currently connected STA (in this embodiment, the STA 103) via each link (link 1 and link 2) of the multi-link. If the data is received, the process advances to step S1005; otherwise, the AP 102 stands by.

In step S1005, the AP 102 transmits an ACK (Acknowledgement) linked with the received data to the currently connected STA (in this embodiment, the STA 103). Then, the series of processes shown in FIG. 10 ends.

As described above, according to this embodiment, if data are transmitted in a plurality of links simultaneously, a trigger frame can be transmitted in one link.

If data are transmitted in a plurality of channels simultaneously, this cannot be covered by the existing trigger frame. However, according to this embodiment, if a trigger frame is transmitted using a given channel, data can be received even in a channel in which no trigger frame is transmitted, and thus data can be received in all the linked channels. Therefore, in multi-link communication, it is possible to prevent the shift of the communication timing.

Second Embodiment

In this embodiment, an example of processing when an AP 102 allocates RUs to STAs 103 and 104 will be described. The arrangement of each apparatus according to this embodiment is the same as in the first embodiment and a detailed description will be omitted.

Figure 8:
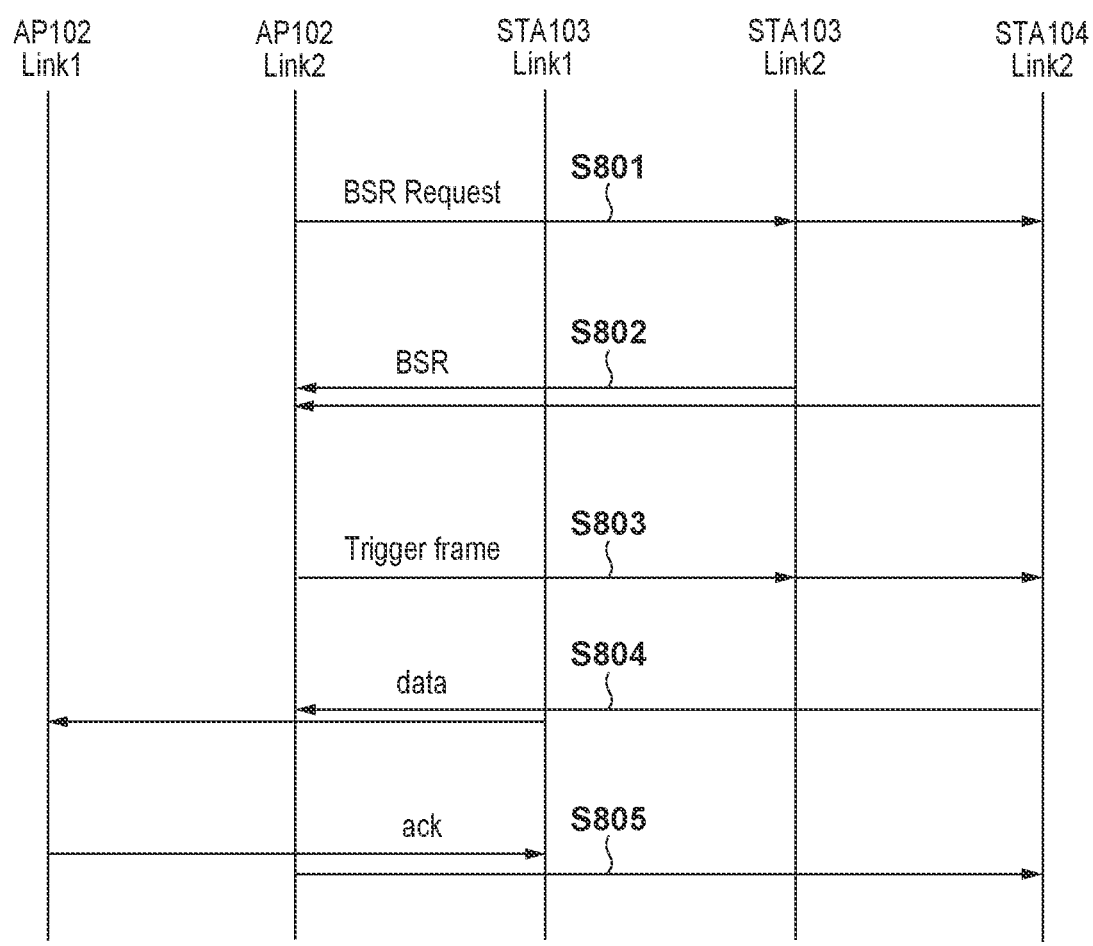
FIG. 8 is a sequence chart when each of communication apparatuses 103 and 104 transmits data to the communication apparatus 102 according to the second embodiment.

FIG. 8 shows an example of a processing sequence according to this embodiment. In the example shown in FIG. 8, with respect to the STA 103, the AP 102 allocates an RU size of 106 to channel 5 in the 2.4-GHz band, and allocates an RU size of 106 to channel 36 in the 5-GHz band. Link 1 of the AP 102 operates using channel 5 in the 2.4-GHz band, and link 2 of the AP 102 operates using channel 36 in the 5-GHz band. Both the STAs 103 and 104 are connected to the AP 102 using channel 36 in the 5-GHz band. Furthermore, only the STA 103 is also connected using channel 5 in the 2.4-GHz band.

First, the AP 102 transmits a BSR Request to each of the STAs 103 and 104 (S801). The BSR Request is transmitted using channel 36 in the 5-GHz band commonly used by the STAs 103 and 104. A response to it is returned using channel 36 in the 5-GHz band. Note that the STA 103 may return the response using channel 5 in the 2.4-GHz band as link 1. The BSR Request and BSR transmitted/received at this time are as described in the first embodiment and a detailed description thereof will be omitted.

The AP 102 allocates an RU size to the STA based on the BSR and a communication status, and transmits a trigger frame (S803). At this time, for example, an RU size of 242 is allocated to channel 5 in the 2.4-GHz band with respect to the STA 103, and an RU size of 242 is allocated to channel 36 in the 5-GHz band with respect to the STA 104. Based on the allocation, each STA transmits data (S804). Then, upon receiving the data, the AP 102 returns an ACK based on the data (S805). The ACK is returned via the link in which the data has been received. This allows each STA to grasp, for each link, that the transmitted data reaches the AP. That is, even if data are transmitted/received asynchronously with respect to the respective links, the reception of the data can be confirmed. Thus, even if data are transmitted/received in a plurality of links, and the data communication rate of a given link is high, it is possible to continue data communication without waiting for the link of a low rate.

On the other hand, an application may separately be notified of the data in the respective links, and the communication apparatus may not be able to receive the data correctly. Thus, the ACK may be transmitted in the link in which the trigger frame has been transmitted. In this case, even if the data are transmitted/received in the plurality of links, the ACK is returned in one link, and thus the links can be synchronized with each other. Therefore, when returning the ACK, data during a period designated by the trigger frame can be arranged by the plurality of links.

<Processing of Communication Apparatus (AP) 102>

Figure 5:
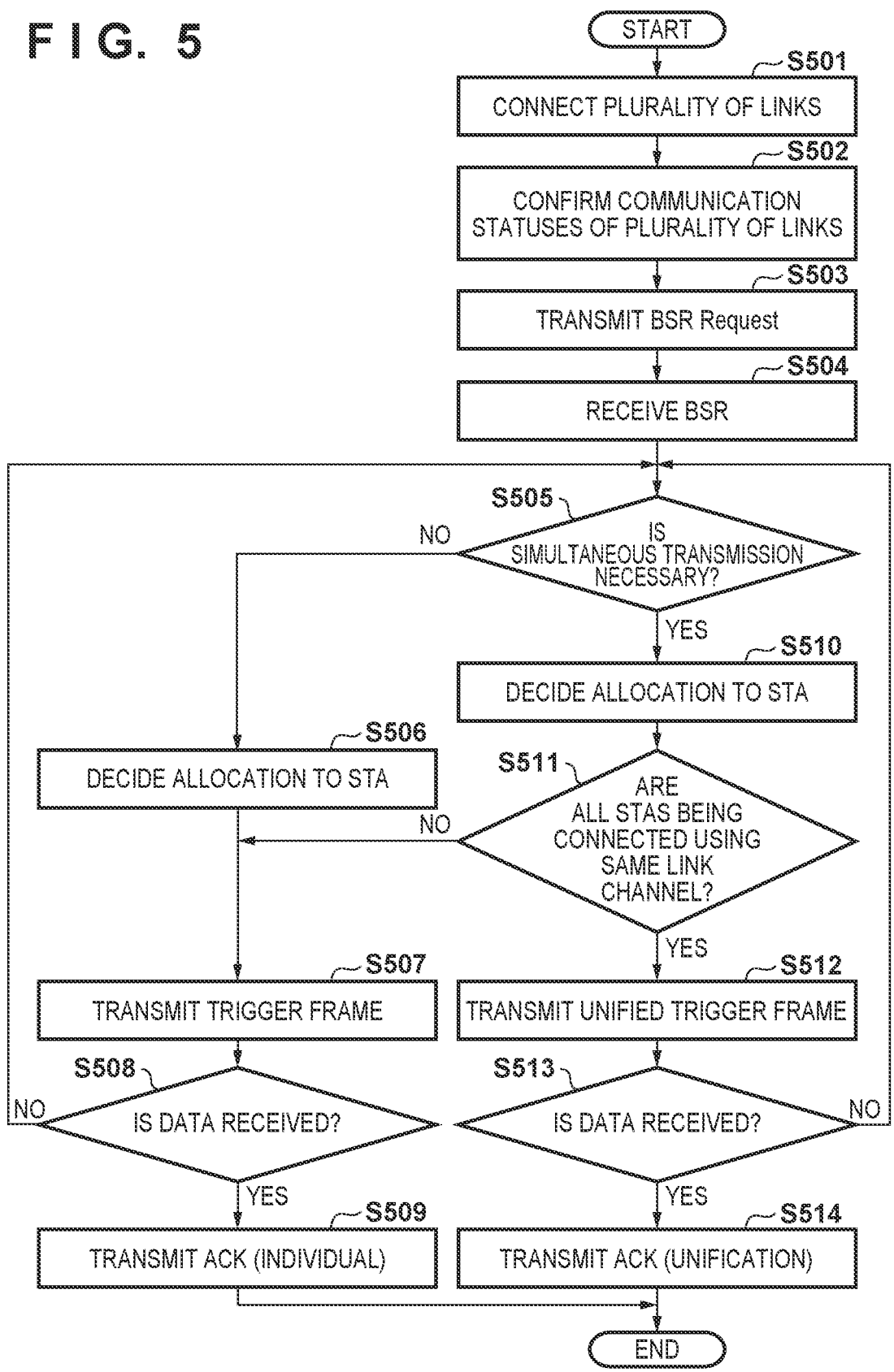
FIG. 5 is a flowchart illustrating the procedure of processing of transmitting a trigger frame by a communication apparatus 102 according to the second embodiment.

The procedure of the processing executed by the AP 102 will be described next with reference to a flowchart shown in FIG. 5.

The AP 102 establishes connections with each STA via a plurality of links (step S501). Next, the AP 102 confirms communication statuses concerning the connections via the plurality of links and the setting of each currently connected STA (step S502). Note that step S502 may be executed at the time of performing connection processing in step S501. Parameters to be confirmed for each STA include a communication rate from the minimum rate to the maximum rate, a communication bandwidth, a communication channel, an MCS, and a parameter indicating whether simultaneous transmission/reception is possible. This allows the AP 102 to grasp a data amount expected to be received when an RU is allocated to the STA 103.

Next, the AP 102 transmits a BSR Request to grasp a data amount to be transmitted by each currently connected STA (step S503). This corresponds to S801 of FIG. 8. If there is data to be transmitted to the AP 102, each STA transmits a BSR. The AP 102 receives the BSR transmitted from each STA (step S504). Note that each STA may transmit a BSR even if there is no data to be transmitted.

Based on the communication statuses of the plurality of links, the setting of each STA, and the data amount waited to be transmitted by each STA, all of which have been confirmed in step S502, the AP 102 determines whether it is necessary to perform simultaneous data transmission (step S505). If YES is determined in step S505, the process advances to step S510; otherwise, the process advances to step S506.

For example, if the link channels connected by each STA are close to each other, or if the STA cannot transmit data in one link and receive data in the other link at the same time, it is necessary to upload data simultaneously by an instruction from the AP 102. In this case, to enter a procedure of transmitting a trigger frame for synchronization across the plurality of links, the process advances to step S510.

If communication channels used by the plurality of links are channel 1 and channel 3 in the 2.4-GHz band, when communication periods deviate from each other, interference occurs to interrupt communication, and thus communication using a trigger frame is required.

Alternatively, if the plurality of links share contents of data, data transmission needs to be performed synchronously. Therefore, as one synchronization method, a method of synchronizing the data using a trigger frame is considered. For example, a case in which the plurality of links share the sequence numbers of the data is considered. If the sequence numbers are transmitted using values common to the plurality of links, it is necessary to grasp the context of the data when integrating the data. As a reference, transmission/reception of trigger frames is used. A unit from a given trigger frame to a next trigger frame is used, the data are integrated within the unit, and the data are sorted by the sequence numbers, thereby grasping data which has been received and data which has not been received.

Subsequently, the AP 102 decides RU allocation to each currently connected STA (step S510). As the allocation method, RUs may be equally divided and allocated to each STA. For example, if the STAs 103 and 104 are connected to the AP 102, an RU size of 106 may be allocated to each of the STAs 103 and 104 so that the RU sizes of the STAs 103 and 104 are equal to each other. Alternatively, RUs may be allocated in accordance with the ratio between the upload data acquired by the BSRs. For example, if the upload data of the STA 103 is 20 and the upload data of the STA 104 is 10, an RU size of 106 may be allocated to the STA 103 and an RU size of 52 may be allocated to the STA 104.

If the allocation to each STA is decided in step S510, the AP 102 determines whether all the STAs are connected using the same link channel (common link channel) (step S511). That is, the AP 102 determines whether a connection via a link common to all the multi-links of the plurality of STAs is included. If YES is determined in step S511, the process advances to step S512; otherwise, the process advances to step S507. Note that this processing may be performed at the time of step S505.

If all the STAs are connected using the same link channel, a trigger frame applicable in the plurality of links can be transmitted. However, if there is an STA operating using a different link channel, it is necessary to transmit a trigger frame for each channel.

For example, as in this embodiment, if the STA 103 is connected using channel 5 in the 2.4-GHz band and using channel 36 in the 5-GHz band, and the STA 104 is connected using channel 36 in the 5-GHz band, a trigger frame is transmitted using channel 36 as the common link channel. However, for example, if the STA 103 is connected using channel 5 in the 2.4-GHz band and the STA 104 is connected using channel 36 in the 5-GHz, there is no common link channel, and thus it is necessary to transmit a trigger frame in each of the link channels of channel 5 and channel 36. Even if the trigger frame is transmitted in each of channel 5 and channel 36, a multi-link trigger frame supporting the plurality of links may be transmitted.

Consider, for example, a case in which both the STAs 103 and 104 are connected using channel 5 in the 2.4-GHz band and using channel 36 in the 5-GHz band but one of the links is set in a power-saving mode to disable reception of data. Furthermore, consider a case in which the STA 103 can receive data using channel 5 in the 2.4-GHz band and the STA 104 can receive data using channel 36 in the 5-GHz band. In this case, by transmitting a multi-link trigger frame in each of the plurality of links, each STA can grasp the allocation of the RUs across the plurality of links.

If all the STAs are connected using the same link channel, that is, a trigger frame (to be also referred to as a "unified trigger frame" hereinafter) obtained by summarizing information of the RUs allocated in the plurality of links is transmitted, the AP 102 transmits the unified trigger frame to each STA in accordance with the allocated RU (step S512). This corresponds to S803 of FIG. 8. The unified trigger frame transmitted at this time is as shown in FIG. 6.

The AP 102 determines whether data transmitted from each STA that has received the unified trigger frame is received (step S513). If YES is determined in step S513, the process advances to step S514; otherwise, the process returns to step S505.

The AP 102 returns an ACK to the received data (step S514). The ACK is returned via the link in which the data has been received. This corresponds to S805 of FIG. 8. Note that in the case of S405 of FIG. 4 described in the first embodiment, one unified ACK is returned for the data received in the plurality of links. After the ACK is transmitted, the series of processes ends. Note that the processing may be repeated from step S503 or S505.

On the other hand, if it is determined in step S505 that simultaneous data transmission is unnecessary, the process advances to step S506 to enter a data transmission/reception procedure for each link.

The AP 102 allocates an RU size to the STA (step S506). The STA to which the RU size is allocated may be decided individually for each use link channel. Allocation may be performed across the plurality of links.

Consider a case in which allocation is performed individually. Consider, for example, a case in which the STA 103 is connected using channel 5 in the 2.4-GHz band and channel 36 in the 5-GHz band, and the STA 104 is connected using channel 36 in the 5-GHz band. If an RU size is decided individually for each link channel, for example, for channel 36, an RU size of 106 is allocated to the STA 103 and an RU size of 106 is allocated to the STA 104. For channel 5, an RU size of 242 is allocated to the STA 103.

Consider a case in which allocation is performed across the plurality of links. At this time, for channel 36, an RU size of 242 is allocated to the STA 103. For channel 5, an RU size of 242 is allocated to the STA 104.

Furthermore, consider a case in which data transmission/reception is managed for each link, that is, allocation is performed individually for each link channel. In this case, since it is unnecessary perform synchronization across the links, the link in which communication is fast need not waits for a link in which communication is slow, thereby making it possible to transmit/receive data more quickly.

If allocation to the STAs is decided for each link, the AP 102 transmits a trigger frame in each link (step S507). As the trigger frame transmitted at this time, a Basic trigger frame complying with the IEEE802.11ax standard is used. That is, the Trigger Type subfield value shown in FIG. 6 is 0 (see Table 1). The User Info field shown in FIG. 6 does not include the Link ID subfield 612 among the subfields 611 to 614 shown in FIG. 6.

The AP 102 determines whether the data transmitted by the STA in response to transmission of the trigger frame is received from the STA (step S508). If YES is determined in step S508, the process advances to step S509; otherwise, the process returns to step S505.

The AP 102 returns an ACK linked with the received data (step S509). The ACK returned at this time is returned based on the received data for each link. The ACK returned at this time complies with an ACK defined in the IEEE802.11 standard. Note that as described in step S514, a common Block ACK may be returned in the plurality of links. After the ACK is transmitted, the series of processes ends. Note that the processing may be repeated from step S503 or S505.

As described above, according to this embodiment, a trigger frame is transmitted to the plurality of STAs via a common link channel. This allows each STA to grasp, for each link, that the transmitted data reaches the AP. That is, even if data are transmitted/received asynchronously with respect to the respective links, the reception of the data can be confirmed.

Third Embodiment

This embodiment will describe an example of processing when an AP 102 transmits data to an STA 103. The arrangement of each apparatus according to this embodiment is the same as in the first embodiment and a detailed description thereof will be omitted. Assume that the STA 103 is in a power-saving state in link 1, and can accept reception of data only in link 2. In this case, it is unnecessary to confirm the amount of upload data of the STA, neither a BSR Request nor a BSR is required. Therefore, processes corresponding to S401 and S402 shown in FIG. 4 are unnecessary in this embodiment.

The AP 102 allocates an RU size in accordance with the amount of data to be transmitted to each STA. Then, the AP 102 sends a notification of the allocation result as a trigger frame (S903). Note that the trigger frame transmitted at this time is as shown in FIG. 6 described in the first embodiment, and the value of the DL/UL subfield in the User Info field is 1.

The STA 103 analyzes contents of the trigger frame, and confirms that data is also received in link 1. Then, the STA 103 stands by for reception of the data in link 1. Based on the allocation result, the AP 102 transmits the data to the STA 103 (S904). The STA 103 returns an ACK linked with the received data to the AP 102 (S905). At this time, the STA 103 may collectively analyze the data for the plurality of links, and transmit a Block ACK, as shown in FIG. 7. Alternatively, an ACK defined in the IEEE802.11 standard may be returned for each link.

As described above, according to this embodiment, even if the STA 103 is in a sleep state in one link, the STA 103 can receive data in a plurality of links by transmitting a trigger frame by the AP 102.

[Modification]

Figure 9:
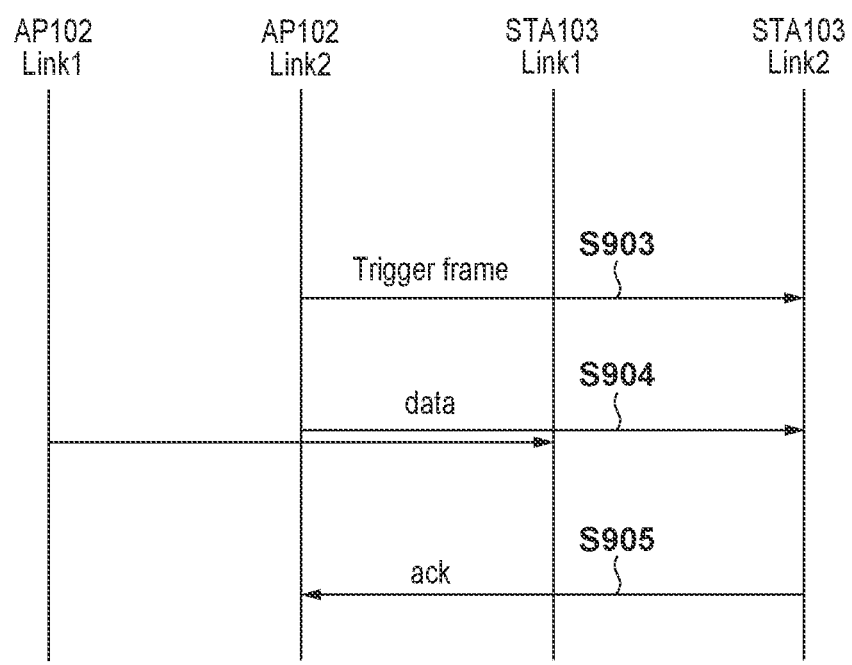
FIG. 9 is a sequence chart when a communication apparatus 102 transmits data to a communication apparatus 103 according to the third embodiment.

In each of the above-described embodiments, transmission and reception of data have been explained separately but the present invention is not limited to this. For example, each apparatus may simultaneously or alternately execute data transmission and data reception. By exemplifying the first and third embodiments, S903 to S905 of FIG. 9 may be executed after S403 to S405 of FIG. 4, and then these processes may be repeated. For example, after S403 to S405 of FIG. 4 are repeated three times, S903 to S905 of FIG. 9 may be repeated five times. S903 to S905 of FIG. 9 may be started first. This can implement data transmission/reception with the reduced overhead. Each embodiment may be repeated, or a trigger frame may be used to instruct to simultaneously perform data transmission and reception. An ACK returned in response to data may be an ACK as a response to single data.

According to the present invention, it is possible to prevent the shift of a communication timing in multi-link communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for wirelessly communicating with another communication apparatus, comprising:
a transmission unit configured to transmit, to the other communication apparatus on a first link with the other communication apparatus, a trigger frame used as a trigger to instruct the other communication apparatus to execute data transmission on a second link, different from the first link, with the other communication apparatus,
wherein the trigger frame includes a Common Info field and one or more User Info fields, and a first User Info field among the one or more User Info fields of the trigger frame includes identification information for identifying the second link, and
wherein the communication apparatus is further communicable with at least one additional communication apparatus, and
the communication apparatus further comprises
a first determination unit configured to determine whether simultaneous data transmission is necessary, based on a communication status of a multi-link of each of the another communication apparatus and the at least one additional communication apparatus, settings of the another communication apparatus and the at least one additional communication apparatus, and a data amount waiting to be transmitted by each of the another communication apparatus and the at least one additional communication apparatus,
a decision unit configured to decide resource unit (RU) allocation to each of the another communication apparatus and the at least one additional communication apparatus currently connected, in accordance with the ratio between upload data of each of the another communication apparatus and the at least one additional communication apparatus, in a case where the first determination unit determines that the simultaneous data transmission is necessary, and
a second determination unit configured to determine whether a connection via a link common to all the multi-links of the another communication apparatus and the at least one additional communication apparatus is included, and wherein
in a case where the second determination unit determines that the connection via the common link is included, the transmission unit transmits the trigger frame to the another communication apparatus and the at least one additional communication apparatus via the common link, in accordance with the allocated result of the resource unit.

2. The communication apparatus according to claim 1, wherein the identification information includes a link number of the second link.

3. The communication apparatus according to claim 1, wherein the identification information includes a channel number of the second link defined in an IEEE802.11 series standard.

4. The communication apparatus according to claim 1, wherein the identification information includes a frequency band of the second link.

5. The communication apparatus according to claim 1, wherein the identification information includes a number of a resource unit.

6. The communication apparatus according to claim 1, further comprising a reception unit configured to receive, on the second link, data that have been transmitted from the other communication apparatus in response to reception of the trigger frame.

7. The communication apparatus according to claim 6, wherein the transmission unit transmits, on the first link, a reception confirmation of the data received by the reception unit from the other communication apparatus.

8. The communication apparatus according to claim 1, further comprising a transmission unit configured to transmit data to the other communication apparatus on the second link by using transmission of the trigger frame as a trigger.

9. The communication apparatus according to claim 8, further comprising a reception unit configured to receive, on the first link, a reception confirmation from the other communication apparatus for the data transmitted by the transmission unit on the second link.

10. The communication apparatus according to claim 1, wherein data communication on the second link is communication in a synchronous mode.

11. The communication apparatus according to claim 1, wherein the trigger frame further includes identification information of the first link on which the trigger frame is transmitted.

12. The communication apparatus according to claim 1, wherein a second User Info field among the one or more User Info fields of the trigger frame includes identification information for identifying the first link.

13. The communication apparatus according to claim 1, wherein each User Info field of the one or more User Info fields is an AID field.

14. The communication apparatus according to claim 1, wherein identification information for identifying the second link is indicated in a Link ID field.

15. A control method for a communication apparatus for wirelessly communicating with another communication apparatus and at least one additional communication apparatus, comprising:
- causing a transmission unit of the communication apparatus to transmit, to the other communication apparatus on a first link with the other communication apparatus, a trigger frame used as a trigger to instruct the other communication apparatus to execute data transmission on a second link, different from the first link, with the other communication apparatus,
- wherein the trigger frame includes a Common Info field and one or more User Info fields, and a first User Info field among the one or more User Info fields of the trigger frame includes identification information for identifying the second link,
- determining whether simultaneous data transmission is necessary, based on a communication status of a multi-link of each of the another communication apparatus and the at least one additional communication apparatus, settings of the another communication apparatus and the at least one additional communication apparatus, and a data amount waiting to be transmitted by each of the another communication apparatus and the at least one additional communication apparatus,
- deciding a resource unit (RU) allocation to each of the another communication apparatus and the at least one additional communication apparatus currently connected, in accordance with the ratio between upload data of each of the another communication apparatus and the at least one additional communication apparatus, in a case where it is determined that the simultaneous data transmission is necessary, and
- determining whether a connection via a link common to all the multi-links of the another communication apparatus and the at least one additional communication apparatus is included,
- wherein in a case where it is determined that the connection via the common link is included, the transmission unit is caused to transmit the trigger frame to the another communication apparatus and the at least one additional communication apparatus via the common link, in accordance with the result decided for the resource unit allocation.

16. A non-transitory computer-readable storage medium storing a computer program for causing a computer to execute a control method for a communication apparatus for wirelessly communicating with another communication apparatus and at least one additional communication apparatus, the method comprising:
- causing a transmission unit of the communication apparatus to transmit, to the other communication apparatus on a first link with the other communication apparatus, a trigger frame used as a trigger to instruct the other communication apparatus to execute data transmission on a second link, different from the first link, with the other communication apparatus,
- wherein the trigger frame includes a Common Info field and one or more User Info fields, and a first User Info field among the one or more User Info fields of the trigger frame includes identification information for identifying the second link,
- determining whether simultaneous data transmission is necessary, based on a communication status of a multi-link of each of the another communication apparatus and the at least one additional communication apparatus, settings of the another communication apparatus and the at least one additional communication apparatus, and a data amount waiting to be transmitted by each of the another communication apparatus and the at least one additional communication apparatus,
- deciding a resource unit (RU) allocation to each of the another communication apparatus and the at least one additional communication apparatus currently connected, in accordance with the ratio between upload data of each of the another communication apparatus and the at least one additional communication apparatus, in a case where it is determined that the simultaneous data transmission is necessary, and
- determining whether a connection via a link common to all the multi-links of the another communication apparatus and the at least one additional communication apparatus is included,
- wherein in a case where it is determined that the connection via the common link is included, the transmission unit is caused to transmit the trigger frame to the another communication apparatus and the at least one additional communication apparatus via the common link, in accordance with the result decided for the resource unit allocation.

* * * * *